(No Model.)
C. HERSCHEL.
APPARATUS FOR MEASURING THE QUANTITY OF WATER FLOWING THROUGH A PIPE.
No. 381,373. Patented Apr. 17, 1888.
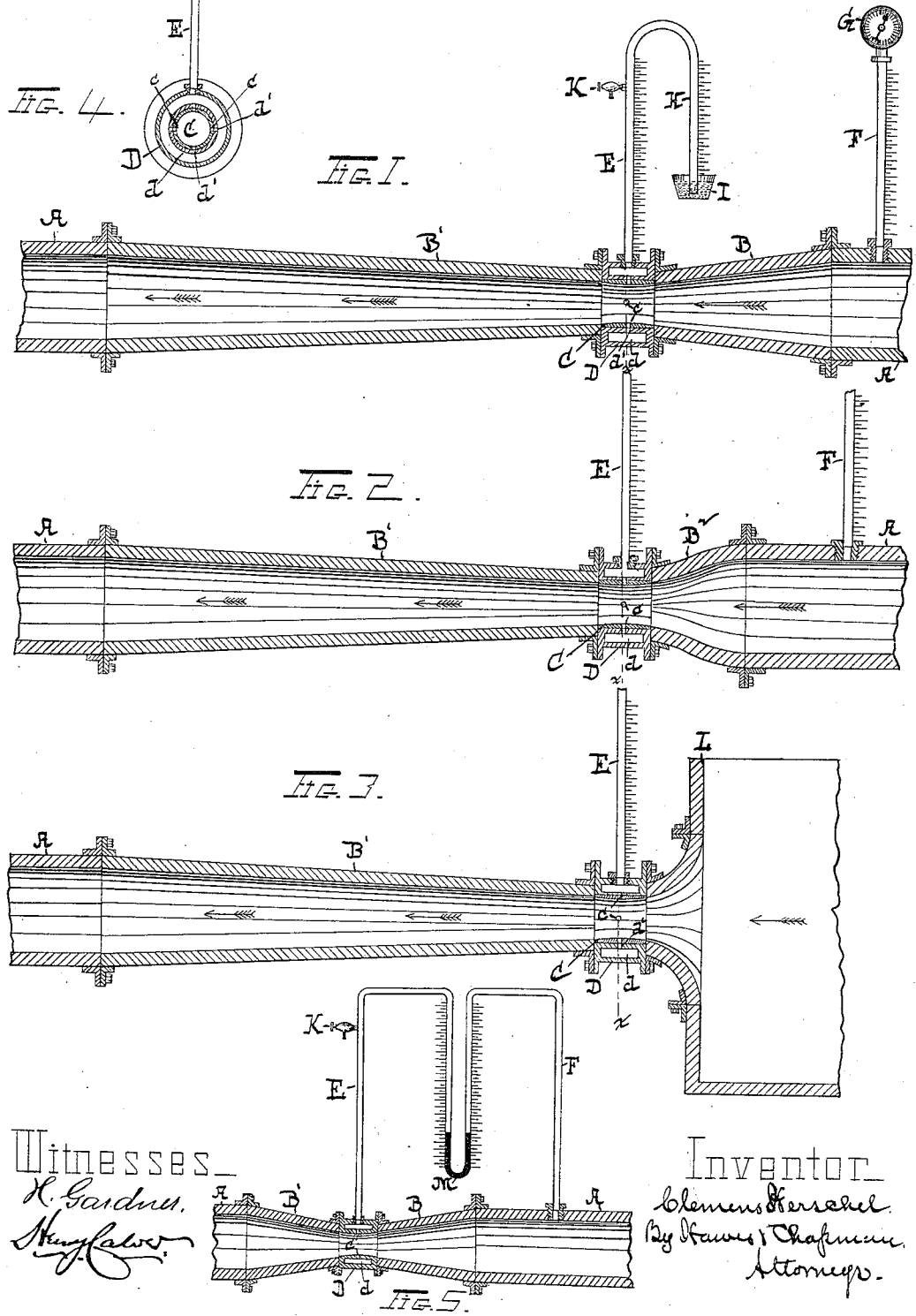

UNITED STATES PATENT OFFICE.

CLEMENS HERSCHEL, OF HOLYOKE, MASSACHUSETTS.

APPARATUS FOR MEASURING THE QUANTITY OF WATER FLOWING THROUGH A PIPE.

SPECIFICATION forming part of Letters Patent No. 381,373, dated April 17, 1888.

Application filed December 12, 1887. Serial No. 257,728. (No model.)

*To all whom it may concern:*

Be it known that I, CLEMENS HERSCHEL, of Holyoke, in the county of Hampden and Commonwealth of Massachusetts, have invented a new and useful Apparatus for Measuring or Gaging the Quantity of Water or other Liquid Flowing Through a Pipe or Tube, of which the following is a specification, reference being had to the accompanying drawings, forming part thereof.

My invention is based upon the well-known property of liquids when flowing through a diverging ajutage or Venturi tube to exercise a sucking action through an aperture in the pipe or tube located at the point of the smallest cross-section of the latter, and upon the further fact that such sucking action increases and decreases in intensity with the increase and decrease of the velocity of the stream flowing through the pipe. I have discovered that the velocity of the flowing stream can be determined by locating such an ajutage or Venturi tube in the pipe or tube forming the conduit of the liquid to be measured, ascertaining by means of suitable gages the height of a column of liquid capable of being lifted by the sucking action of the ajutage, and also the head of the liquid in the cylindrical portion of the pipe or tube, and then computing the discharge through the smallest cross-section of the ajutage as though it took place under a head equal to the difference in level between said column of liquid and the head of the liquid in the cylindrical portion of the pipe or tube, for which I find a coefficient nearly equal to one. The velocity of the stream at the smallest cross-section of the ajutage being thus determined and the area of said cross-section being known, the quantity of liquid flowing therethrough in cubic feet per second can be readily ascertained in the usual manner by multiplying the one by the other. By this method, therefore, I am able to measure liquids flowing through a pipe by utilizing the method of computation of the discharge of liquids through an orifice under a material head, but without losing any material portion of the total head of the liquid flowing through the pipe, which has been the main difficulty to overcome in all plans for the metering of large quantities of water or other liquids when flowing through the larger sizes of pipes or tubes. For the purpose of facilitating the measurement of liquids by this method I have devised the apparatus hereinafter fully described, and particularly pointed out in the claims.

Referring to the drawings, in which like letters designate like parts in the several figures, Figure 1 is a longitudinal sectional view of a pipe provided with said apparatus. Fig. 2 is a similar view of a slightly-modified form of the apparatus. Fig. 3 is a like view of the apparatus as applied to the outlet of a tank or reservoir. Fig. 4 is a transverse section taken upon line $x$ $x$ in Figs. 1, 2, and 3. Fig. 5 is a view similar to Figs. 1, 2, and 3, showing still another modification of certain portions of the apparatus.

In Figs. 1 and 2, the letter A designates the pipe or tube the quantity of liquid flowing through which it is desired to measure, the direction of the flow of the liquid being indicated by the arrows. At any desired point in said pipe or tube is located the metering apparatus, which I call a "Venturi meter," composed, as shown in Fig. 1, of a converging section, B, and diverging section B', said sections being connected to the abutting ends of pipe A by suitable flanges and bolts, as shown. In Fig. 2 the converging section of the meter instead of being in form of a frustum of a cone, as in Fig. 1, is made by the revolution of an ogee curve about the axis of pipe A, as shown at $B^2$. The two sections of the meter are connected by a throat-piece, C, the bore of which increases slightly in diameter from its central cylindrical portion toward each end, the ends of said throat-piece and the adjacent ends of the converging and diverging sections of the meter being connected by suitable flanges, as shown. At the point of its smallest diameter said throat-piece is provided with orifices $c$, preferably four or more in number, as shown in Fig. 4, extending through its shell, and surrounding said throat-piece is a jacket, D, having an air-chamber, $d$, extending entirely around the throat-piece, said jacket having the orifices $d'$ coinciding with the orifices $c$ in the throat-piece, whereby communication between the interior of the throat-piece and the air-chamber is established. The suction created by the liquid as it flows through the ajutage will be exerted upon the air-chamber through each of the passages c d' simultaneously, and therefore the degree of suction created can be very accurately determined by means of a suitable gage connected with the air-chamber. It is obvious that by connecting a glass tube, E, at its lower end to the jacket D, in such manner that communication between the bore of the tube and the air-chamber is established, and connecting another tube, F, in a similar manner to the cylindrical portion of pipe A, as shown in Figs. 1 and 2, and continuing said tubes upwardly to the normal level of the liquid at the source from which said pipe A leads, the liquid will stand in said tubes E F and at said source at the same level, so long as the liquid remains stationary—that is to say, does not flow through pipe A. It is equally obvious that as soon as the liquid commences to flow through pipe A the suction created through the passages c d' and air-chamber d will cause a depression in the level of the column of water in tube E, which depression will increase with the increasing velocity of the flow of the liquid through said pipe. The difference in pressure, therefore, between the liquid at the point of smallest cross-section of the throat-piece and at the point in the cylindrical portion of pipe A, selected for the position of tube F, will be indicated by the difference between the level of the column of liquid in tube E and that in tube F, which can be determined at once by providing said tubes with scale-marks, as shown.

The head of the liquid at the center of the throat-piece being thus determined, the velocity of the stream at that point can be readily computed by the well-known equation $v = \sqrt{2gh}$, in which $v$ represents the velocity in feet per second, $g$ represents the space through which a body falls by the action of gravity in the first second of time, and $h$ represents the head already spoken of in feet, and having ascertained the velocity, the area of the throat-piece at its center being known, the quantity of liquid flowing therethrough in cubic feet per second can be at once determined as previously stated.

While such an arrangement of the apparatus would answer very well for the purposes of experiment, it would be impracticable in most instances for actual use to continue the tubes E F to such a height, and therefore the form of apparatus shown in Fig. 1 will be found to be the better adapted for general use. In said figure the tube F is provided at its upper end with a pressure-gage, G, which may be of any of the common forms of such gages, its function being to register the head of the liquid in the cylindrical portion of pipe A—or, in other words, the weight of the column of water capable of being lifted by the pressure exerted by the liquid within said pipe. Tube E is bent into siphon form, and the limb H thereof has its lower end immersed in mercury contained in the vessel I, while a valve, K, is located in the limb E, as shown, to govern the admission of air into the tube. When the valve K is open, it permits the normal pressure of the atmosphere to be exerted upon the column of water within tube E in the same manner as if said tube were entirely open at the top. When said valve K is closed, the tube E H forms a vacuum-gage, and its function is to register the degree of suction at the throat-piece when said suction has reduced the level of the column of water in tube E, or depressed what is known to engineers and others as the "hydraulic gradient" below the upper surface of the throat-piece, where, of course, its level could not be observed by means of the tube E alone. As soon as said hydraulic gradient is depressed by the suction below the level of the top of throat-piece with valve K open, said valve is closed, and a vacuum being then created in the tube E H the mercury at once rises in the limb H, and the true depression of the hydraulic gradient can then be found in the following manner:

Suppose the gage F G and the vacuum-gage H I to read from a common zero or basis of levels. Then ascertain the elevation of the top of the bore of throat-piece C on this same scale of heights, and imagine the readings of the vacuum-gage, reduced to the height of an equivalent column of water, subtracted from this elevation of the crown of the throat-piece. The low point thus found is the locus of the hydraulic gradient at the smallest cross-section of the throat-piece. The true depression of the hydraulic gradient being thus determined, the difference between its level and that of the level of the column of water in tube F, as indicated by gage G, will, as previously stated, give the head of the liquid at the point of smallest cross-section of the throat-piece, after which the quantity of liquid passed therethrough can be ascertained as previously described.

It will thus be observed that by the use of this simple apparatus I am enabled to accurately gage the quantity of liquid flowing through a pipe, even when the latter is located beneath the surface of the ground—such as a street water-main—and in other such partly inaccessible positions, and without, as previously stated, losing any material portion of the total head of the liquid flowing through the pipe.

As shown in Fig. 3, the apparatus is applied to the outlet-opening of a tank or reservoir, L, in which case as the head at said opening is readily obtainable by actual measurement within said tank or reservoir the tube F and gage G are omitted, the operation of the apparatus otherwise being the same as that previously described.

In Fig. 5 I have shown the throat-piece as being made integral with the jacket, as it may be when the jacket is made of brass or other metal not liable to become corroded by the liquid, and have shown the tubes E F as being united by the U-shaped bend M, containing mercury at its lowest point, said U-shaped portion being provided with scale-marks, as shown. By this arrangement of the tubes a compound gage is formed, by means of which the difference in head of the liquid at the points where the tubes E F are located will be indicated by the movement of the column of mercury in the tube M.

I do not wish to limit myself to the particular devices shown and described for measuring the head of the liquid at the points specified, as it is obvious that the construction of said devices can be greatly varied without departing from the spirit of my invention.

Having thus fully described my invention, what I claim, and desire to secure by Letters Patent, is—

1. As a means for facilitating the measurement of liquids flowing through a pipe by the method herein described, an ajutage or Venturi tube located in said pipe, said ajutage being perforated at the point of its smallest cross-section, whereby suction will be created by the liquid as it flows through the pipe, a suitable gage for measuring the intensity of said suction, and a gage for indicating the head of the liquid in the cylindrical portion of the pipe adjacent to said ajutage, arranged and operating substantially in the manner set forth.

2. As a means for facilitating the measurement of liquids flowing through a pipe by the method herein described, an ajutage or Venturi tube located in said pipe, said ajutage comprising a throat-piece having at the point of its smallest cross-section a series of perforations, an air-chamber surrounding said throat-piece and communicating therewith by means of said perforations, a vertically-disposed tube communicating with said air-chamber, and a gage for indicating the level of the liquid in said tube, substantially as and for the purpose set forth.

3. As a means for facilitating the measurement of liquids flowing through a pipe by the method herein described, an ajutage or Venturi tube located in said pipe, said ajutage comprising a throat-piece having at the point of its smallest cross-section a series of perforations, an air-chamber surrounding said throat-piece and communicating therewith by means of said perforations, a vertically-disposed tube communicating with said air-chamber, a valve governing the admission of air to said tube, a gage for indicating the level of the liquid in said tube when said valve is open, and a vacuum-gage for indicating the suction created in said tube by the passage of the liquid through the ajutage when said valve is closed, arranged and operating substantially in the manner and for the purpose set forth.

4. The liquid-metering apparatus herein described, consisting of the converging and diverging pipe-sections B B' located in pipe A, throat-piece C, uniting said sections, said throat-piece having the series of perforations $c$, jacket D, surrounding said throat-piece, and having air-chamber $d$, communicating with the perforations $c$, tube E, communicating with said air-chamber, tube F, communicating with pipe A at a point adjacent to said pipe-section B, and suitable gages for indicating the level of the liquid in said tubes E F, arranged and operating substantially in the manner set forth.

5. The liquid-metering apparatus herein described, consisting of a conduit, A, having the converging and diverging portions B B', throat-piece C, uniting the ends of said portions B B', said throat-piece having a bore increasing slightly in diameter from a central cylindrical portion toward each end, and having in its central cylindrical portion the series of perforations $c$, jacket D, surrounding said throat-piece, and having air-chamber $d$, communicating with the bore of the throat-piece by means of the perforations $c$, tube E, communicating at one end with said air-chamber and having its opposite end bent to form the limb H, the end of which limb is immersed in mercury, tube F, communicating at one end with conduit A adjacent to the diverging portion B thereof, and a pressure-gage, as G, connected with said tube at its opposite end, arranged and operating substantially as and for the purpose described.

CLEMENS HERSCHEL.

Witnesses:
 W. H. CHAPMAN,
 J. E. CHAPMAN.